United States Patent
Barrows et al.

(10) Patent No.: US 8,598,069 B2
(45) Date of Patent: Dec. 3, 2013

(54) ALDEHYDE REDUCING COMPOSITONS

(75) Inventors: William Barrows, Elizabethtown, PA (US); Gourish Sirdeshpande, Lancaster, PA (US); Kenneth G. Caldwell, Mountville, PA (US); John R. Garrick, Lancaster, PA (US); Michael Cook, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 12/460,501

(22) Filed: Jul. 20, 2009

(65) Prior Publication Data
US 2010/0016152 A1    Jan. 21, 2010

Related U.S. Application Data

(60) Provisional application No. 61/135,309, filed on Jul. 18, 2008.

(51) Int. Cl.
| | |
|---|---|
| *B01J 20/22* | (2006.01) |
| *B01J 20/04* | (2006.01) |
| *B01D 53/72* | (2006.01) |
| *B01D 53/44* | (2006.01) |
| *C01F 5/24* | (2006.01) |
| *C01F 11/18* | (2006.01) |

(52) U.S. Cl.
USPC ......... 502/401; 502/400; 423/245.1; 423/430

(58) Field of Classification Search
USPC ............. 502/400, 401; 423/245.1, 430
See application file for complete search history.

(56) References Cited

U.S. PATENT DOCUMENTS

| | | | | |
|---|---|---|---|---|
| 4,707,515 | A * | 11/1987 | Gilch et al. | 524/506 |
| 4,962,141 | A * | 10/1990 | Iacoviello et al. | 524/92 |
| 5,174,959 | A * | 12/1992 | Kundu et al. | 422/59 |
| 5,629,382 | A * | 5/1997 | Cipolli et al. | 525/158 |
| 6,478,864 | B1 * | 11/2002 | Field | 106/169.17 |
| 6,911,189 | B1 * | 6/2005 | Koller et al. | 423/245.1 |
| 2001/0034391 | A1 * | 10/2001 | Eck et al. | 524/188 |
| 2004/0092639 | A1 * | 5/2004 | Kasahara et al. | 524/425 |
| 2006/0199732 | A1 * | 9/2006 | Simpson et al. | 502/401 |
| 2008/0057318 | A1 * | 3/2008 | Adzima et al. | 428/426 |
| 2009/0032101 | A1 * | 2/2009 | Kempe et al. | 136/259 |

* cited by examiner

*Primary Examiner* — Stuart Hendrickson
*Assistant Examiner* — Daniel Berns

(57) ABSTRACT

A composition which provides enhanced removal of aldehydes from the air of the building interior. The composition includes an amino silane and a multivalent metal carbonate and is especially suitable for adding to building product board substrates, such as acoustical ceiling panels and gypsum wallboards. The composition of the invention can be applied during manufacturing or can be post applied to already constructed room surfaces. The composition provides longevity of aldehyde removal heretofore unachieved.

15 Claims, 2 Drawing Sheets

ALDEHYDE REDUCING COMPOSITONS

CROSS REFERENCE TO RELATED APPLICATION

This application claims the benefit under 35 U.S.C. §119(e) of U.S. provisional application Ser. No. 61/135,309, filed Jul. 18, 2008, entitled "Aldehyde Reducing Coating."

FIELD OF THE INVENTION

The present invention relates to materials for the interior building environment and specifically to building materials which have the capability to reduce the amount of volatile organic compounds (VOC's), such as aldehydes, in the interior building space. More specifically, compared to other known aldehyde reducers, the combination of amino silane (AS) and multivalent metal carbonate (MVMC) is unexpectedly superior in reducing formaldehyde with a longevity of reaction heretofore unachieved.

BACKGROUND OF THE INVENTION

A wide variety of building materials and finishing materials in static structures, such as homes, commercial buildings and schools are commonly coated and/or impregnated with compositions designed to impart the ability to reduce the concentration of VOC's. Porous building materials, such as ceiling tile substrates prepared from a slurry of fibers, fillers and binders, are exemplary of such materials.

In the following description, formaldehyde is used for illustrative purposes of a VOC which includes other aldehydes. The International Agency on Cancer Research has classified formaldehyde as a known carcinogen. Exposure to high concentrations of formaldehyde, as well as chronic exposure at lower concentrations, can cause watery eyes, burning sensations in the eyes and throat, difficulty in breathing and other symptoms. It is also common for people to develop sensitivity to formaldehyde, as well as other aldehydes, resulting in skin rashes, hives and the like. People are often exposed to formaldehyde in the interior building environment through its use in construction materials, wood products, textiles, home or office furnishings, paper, cosmetics, cigarette smoke, pharmaceuticals and indoor cleaning products. Formaldehyde levels are particularly high in new construction due to high emissions from new construction materials. Thus, there has been a long felt need to reduce or eliminate formaldehyde concentrations in the interior building environment.

Conventional attempts include but are not limited to reaction with amines and other formaldehyde reactive materials. Furthermore, there have been attempts, specifically in the art of ceiling tile and gypsum wallboard substrates, to include formaldehyde reducing additives in the overall formulation of the slurry from which the board is made as well as in the coatings applied thereto. Although some reduction of formaldehyde from the air has been achieved via these reactive systems, the formaldehyde reduction is short lived. As a result, a more effective formaldehyde reducer, and in particular, one having a long efficacy of substantial formaldehyde reduction is needed.

SUMMARY OF THE INVENTION

The present invention provides an aldehyde reducing composition for building materials, such as porous substrates and cellulose substrates; as well as other building materials such as metal and glass. The composition of the invention is especially suitable for adding to building product board substrates, such as acoustical ceiling panels and gypsum wallboards. The composition of the invention can be applied during manufacturing or can be post applied to already constructed room surfaces.

In one example embodiment, a composition formulation includes the dry product of water, amino silane (aminopropyltriemethyoxy silane) and a multivalent metal carbonate. The multivalent metal carbonate is selected form the group consisting of calcium carbonate and magnesium carbonate. The composition may optionally include silica gel to achieve even greater aldehyde reduction. As will be evidenced by the following description, the combination of amino silane and a multivalent metal carbonate provides an unexpected superior spectrum of properties heretofore unachieved by known aldehyde reactive systems. The composition provides greater formaldehyde reduction over a long period of time heretofore unachieved. Also, the chemisorptions reaction results in aldehyde being permanently-bonded within the composition thereby preventing release of the aldehyde back into the air. Even more surprisingly, when silica gel is added to the amino silane and multivalent metal carbonate, even longer term efficacy is obtainable.

DETAILED DESCRIPTION OF THE INVENTION

Figure 1:
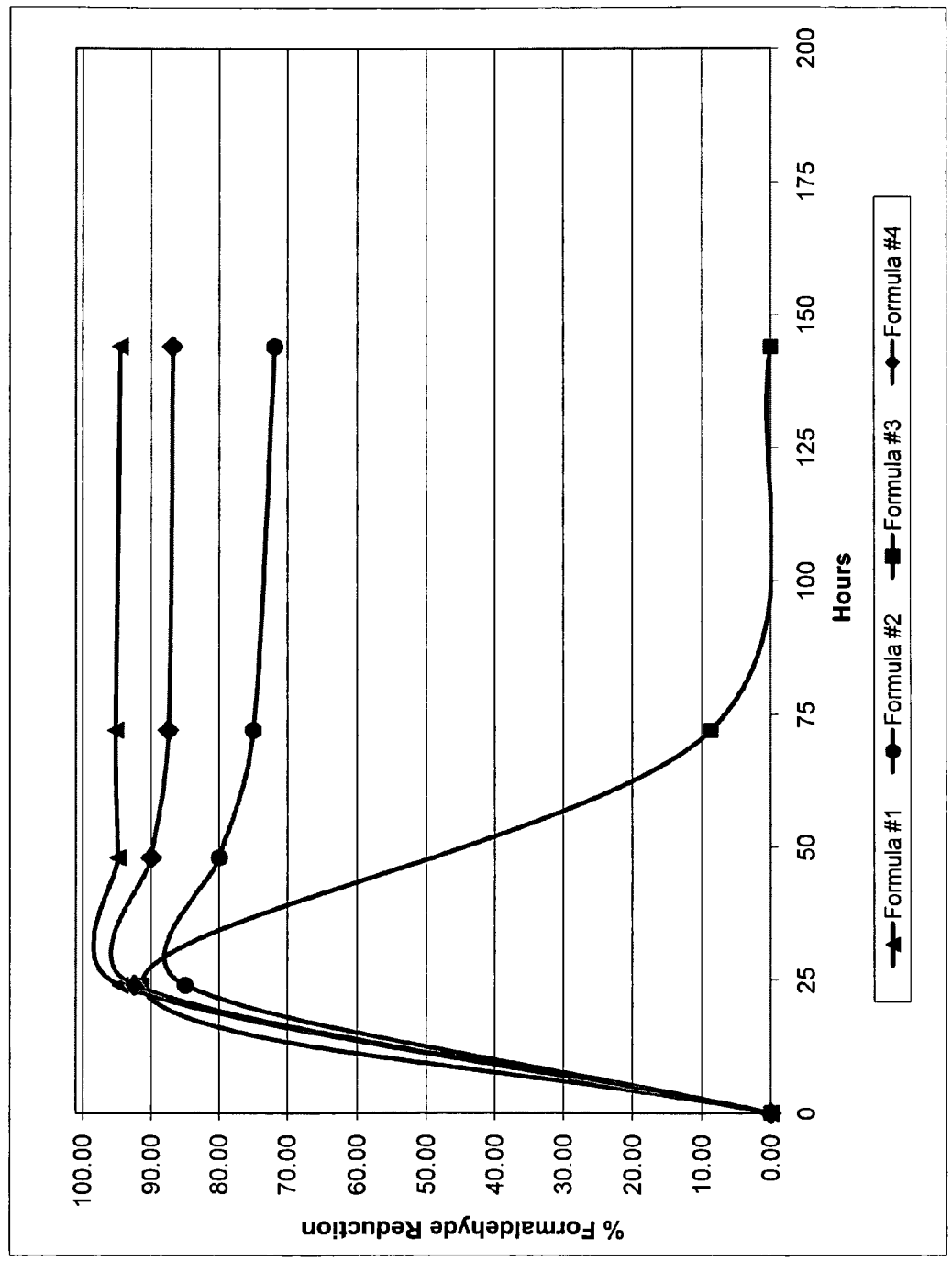
FIG. 1 is a graphic representation of Tables 5-8 showing data of percent of formaldehyde reduced (Y) vs. time (X).

The primary ingredients of the composition of the invention are an AS and a MVMC. As set forth in more detail below, monoamino silane and diamino silane were each added to coating formulations which included a MVMC, and, specifically, calcium carbonate. The coating was applied via spraying, however, the coating can applied by any other method including roller, brush, roll coating, curtain coating, and knife coating. In the specific use of the system in a coating formulation, the solids content is in the range from about 1% to about 90% and is preferably around 50%. The composition of the invention is preferably waterborne, however, solvent mixtures can also be used as long as the solute can disperse the formaldehyde reacting additive.

Each example coating formulation set forth in Tables 1-4 was applied to glass microfiber filter paper to test its formaldehyde removal capability and efficacy. The formaldehyde reduction testing was conducted in a 65L stainless steel environmental testing chamber using the Environmental Chamber Test described in more detail below. Water, amino silane and optionally silica gel are first mixed together to form a wet mixture. Other additives, except for the binder, are then added to the wet mix. The binder is then mixed into the wet mixture now containing the other additives.

Table 1 below illustrates a first example coating formulation (formulation #1).

TABLE 1

| Ingredient | Purpose | % of Wet Weight | % of Dry Weight |
| --- | --- | --- | --- |
| Water | Solute | 30.00 | 0 |
| Ethylene Vinyl Chloride Latex | Binder | 7.33 | 6.80 |

TABLE 1-continued

| Ingredient | Purpose | % of Wet Weight | % of Dry Weight |
|---|---|---|---|
| Diphenyl Amine | Antioxidant | 1.00 | 0.92 |
| Sodium Polyacrylate | Dispersant | 0.08 | 0.15 |
| Silicone Defoamer | Defoamer | 0.06 | 0.12 |
| Calcium Carbonate Slurry | Filler | 46.53 | 64.34 |
| Diamino Silane (N-aminoethyl aminopropyl trimethoxy silane) | Aldehyde Reactant | 5.00 | 9.27 |
| Silica gel | | 10.00 | 18.4 |

Solids = 54%
Filler/Binder Ratio = 14.4
Wet Application = 20 g/ft2
Dry Application = 10.8 g/ft2
Calculated Amino Silane Application = 1.0 g/ft2
Calculated Silica Gel Application = 2.0 g/ft2

Table 2 below illustrates a second example coating formulation containing no silica gel (Formulation #2).

TABLE 2

| Ingredient | Purpose | % of Wet Weight | % of Dry Weight |
|---|---|---|---|
| Water | Solute | 30.00 | 0 |
| Ethylene Vinyl Chloride Latex | Binder | 7.33 | 6.80 |
| Diphenyl Amine | Antioxidant | 1.00 | 0.92 |
| Sodium Polyacrylate | Dispersant | 0.08 | 0.15 |
| Silicone Defoamer | Defoamer | 0.06 | 0.12 |
| Calcium Carbonate Slurry | Filler | 56.53 | 82.74 |
| Diamino Silane (N-aminoethyl aminopropyl trimethoxy silane) | Formaldehyde Reactant | 5.00 | 9.27 |

% Solids = 54
Filler/Binder Ratio = 14.4
Wet Application = 20.0 g/ft2
Dry Application = 10.8 g/ft2
Calculated Amino silane Application = 1.0 g/ft2

Table 3 below illustrates a third example coating formulation containing no calcium carbonate (Formulation #3).

TABLE 3

| Ingredient | Purpose | % of Wet Weight | % of Dry Weight |
|---|---|---|---|
| Water | Solute | 83.94 | 0 |
| Silicone Defoamer | Defoamer | 0.06 | 0.12 |
| Diphenyl Amine | Antioxidant | 1.00 | 0.92 |
| Diamino Silane (N-aminoethyl aminopropyl trimethoxy silane) | Formaldehyde Reactant | 5.00 | 9.27 |
| Silica gel | | 10.00 | 18.4 |

% Solids = 16
Wet Application = 20.0 g/ft2
Dry Application = 3.2 g/ft2
Calculated Amino Silane Application = 1.0 g/ft2
Calculated Silica Gel Application = 2.0 g/ft2

Table 4 below illustrates a forth example coating formulation (Formulation #4) containing a monoamino silane.

TABLE 4

| Ingredient | Purpose | % of Wet Weight | % of Dry Weight |
|---|---|---|---|
| Water | Solute | 30.00 | 0 |
| Ethylene Vinyl Chloride Latex | Binder | 7.33 | 6.80 |
| Diphenyl Amine | Antioxidant | 1.00 | 0.92 |
| Sodium Polyacrylate | Dispersant | 0.08 | 0.15 |
| Silicone Defoamer | Defoamer | 0.06 | 0.12 |
| Calcium Carbonate Slurry | Filler | 46.53 | 64.34 |
| Monoamino Silane (Aminopropyltriethoxy silane) | Formaldehyde Reactant | 5.00 | 9.27 |
| Silica gel | | 10.00 | 18.4 |

Solids = 54%
Filler/Binder Ratio = 14.4
Wet Application = 20 g/ft2
Dry Application = 10.8 g/ft2
Calculated Amino Silane Application = 1.0 g/ft2
Calculated Silica Gel Application = 2.0 g/ft2

The amino silane can be amino $C_{1-2}$ alkoxy silane selected from the group consisting of triethoxy silane, trimethoxy silane, methyldiethoxy silane and methyldimethoxy silane, or other silane materials that have amino functionality attached, which includes, but is not limited to, N-amino ethyl-aminopropyl-trimethoxy silane, N-amino ethyl-aminopropyl-triethoxy silane, N-amino ethyl-aminopropylmethyldimethoxy silane, N-amino ethyl-aminopropylmethyldiethoxy silane, aminopropyl-triethoxy silane, aminopropyl-trimethoxy silane.

Although the preferred binder is ethylene vinyl chloride, any conventional binding agent can be used. For example, the binder can be any of the following: ethylene vinyl chloride, epoxies, urethanes, polyesters, natural and modified natural polymers (such as protein or starch), and polymers that contain any of the following monomers→vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, and any ester. The composition can optionally contain small amounts of processing additives including surfactants, defoamers, dispersing agents, thickeners, biocides and antioxidants. For example the antioxidant, diphenyl amine, though not required to achieve formaldehyde reduction, is included in the above formulations in order to prevent oxidation of the amine reactive groups when such amine groups are exposed to heat processes where the temperature exceeds 75 degrees Celsius. Thus, the antioxidant is unnecessary if no post drying process heating is required. Antioxidants can include, but are not limited to, diphenyl amines, tris(nonylphenyl) phosphite, benzophenone sulfonic acid, substituted benzophenone, di(tridecyl) thiodipropionate, and hindered phenols.

Method for Measuring Formaldehyde Reduction:

Purified air mixed with known amount of formaldehyde from a Permeation Oven is introduced continuously into an Environmental Test Chamber at a fixed flow rate. A sample with the test-coating is placed inside the chamber. The test chamber and the air are maintained at 73.5 F and the relative humidity of the air is 50%. The formaldehyde concentration in the output stream in measured in accordance with ASTM D-5197 Test Method at various time intervals. Based on the difference between the input and output formaldehyde concentrations, the percentage reduction in formaldehyde is estimated. In general, the overall methodology follows the guidelines provided in ASTM D-5116 and ISO 16000-23 (draft).

The extent of reduction in formaldehyde was determined at 2 levels of input concentration—1.6 ppm. and 0.1 ppm. The extent of reduction was found to be independent the input concentration for a given sample size. But the duration of reduction was inversely proportional to the input concentration and directly proportional to sample size. These results confirm that formaldehyde reacts with the test-coating following $1^{st}$ order reaction kinetics.

The longevity of formaldehyde reduction at typical room concentration of 0.013 ppm was estimated assuming $1^{st}$ order kinetics:

Conversion: 1.60 ppm/0.013 ppm/24 hrs/day/365 days/year=years

TABLE 5

Formulation #1 (Formaldehyde Input 1.60 ppm)

| Time (hours) | Measured (ppm) | Formaldehyde Reduced (%) |
|---|---|---|
| 0 | 1.60 | 0 |
| 24 | 0.092 | 94.52 |
| 48 | 0.086 | 94.88 |
| 72 | 0.081 | 95.18 |
| 144 | 0.092 | 94.52 |

Sample size: 3 × 3 inches
Air Humidity 50% Rh.
Temperature 73.5 F.
Air flow rate - 1.3 Air Change per hour

TABLE 6

Formulation #2 (Formaldehyde Input 1.60 ppm)

| Time (hours) | Measured (ppm) | Formaldehyde Reduced (%) |
|---|---|---|
| 0 | 1.60 | 0 |
| 24 | 0.14 | 91.3 |
| 72 | 1.47 | 8.70 |
| 168 | 1.60 | 0 |

Sample size: 3 × 3 inches
Air Humidity 50% Rh.
Temperature 73.5 F.
Air flow rate - 1.3 Air Change per hour

TABLE 7

Formulation #3 (Formaldehyde Input 1.60 ppm)

| Time (hours) | Measured (ppm) | Formaldehyde Reduced (%) |
|---|---|---|
| 0 | 1.60 | 0 |
| 24 | 0.24 | 85.0 |
| 48 | 0.32 | 80.0 |
| 72 | 0.40 | 75.5 |
| 144 | 0.45 | 71.9 |

Sample size: 3 × 3 inches
Air Humidity 50% Rh.
Temperature 73.5 F.
Air Flow rate - 1.3 Air Change per hour

TABLE 8

Formulation #4 (Formaldehyde Input = 1.60 ppm)

| Time (hours) | Measured (ppm) | Formaldehyde Reduced (%) |
|---|---|---|
| 0 | 1.60 | 0 |
| 24 | 0.12 | 92.50 |
| 48 | 0.16 | 90.00 |
| 72 | 0.20 | 87.50 |
| 144 | 0.21 | 86.87 |

Sample size: 3 × 3 inches
Air Humidity 50% Rh.
Temperature 73.5 F.
Air flow rate - 1.3 Air Change per hour Tables 5-8 are represented graphically in FIG. 1.

The graph shown in FIG. 1 illustrates clearly that the system of the invention is highly effective in reducing formaldehyde. Surprisingly, the formulations #1, #2 and #4 having both an amino silane and calcium carbonate exhibit clearly the unexpected substantial improvement of high aldehyde reduction capability over a long period of time. FIG. 1 further illustrates that the amino silane and calcium carbonate combination without silica gel is clearly more effective for long term formaldehyde reduction than using an amino silane and silica gel alone, i.e. without the calcium carbonate. Further, diamino silane is clearly more effective than a monoamino silane. Moreover, the formulation of Tables 5 and 8 provided the best results, which, in turn, suggest that amino silane, silica gel and multivalent metal carbonate work synergistically to remove formaldehyde with superior and unexpected long term reactivity. It is believed that the amino silane spreads over the surface area of the silica gel forming a near monolayer of amino silane and that such monolayer is indeed formed without the need for chemical grafting which is conventionally required in the art to form such monolayers. Regardless of the actual mechanism, formulations which display this behavior are extremely useful in improving the air quality of the interior building environment.

The composition of the invention can be applied in the manufacturing of a building product board substrate or post applied to already constructed room surfaces. One anticipated application of the formaldehyde reducing coating of the invention is as the finish coating for mineral fiber acoustical ceiling tile such as CIRRUS ceiling tiles available from Armstrong World Industries, Inc. The following is to be construed as merely illustrative, and not limitative of the remainder of the disclosure in any way whatsoever. In the following example, all parts and percentages are by weight unless otherwise indicated.

Formulation #1 set forth above was applied to acoustical ceiling tiles, and particularly, to CIRRUS ceiling tiles and tested using the test method set forth above. The following conditions were used: Formaldehyde Input=1.60; Loading Factor=0.40/m; Relative Humidity=50%; Temperature=25 C.

Table 9 illustrates the longevity of formaldehyde reduction at typical room concentration of 0.013 ppm using the conversion set forth above.

TABLE 9

| Time in Hours @ 1.60 ppm | Measured (ppm) | Time in Years @ .013 ppm** |
|---|---|---|
| 0 | 1.600 | 0 |
| 24 | 0.121 | 0.34 |
| 72 | 0.119 | 1.01 |

TABLE 9-continued

| Time in Hours @ 1.60 ppm | Measured (ppm) | Time in Years @ .013 ppm** |
|---|---|---|
| 144 | 0.130 | 2.02 |
| 216 | 0.150 | 3.03 |
| 312 | 0.240 | 4.38 |
| 384 | 0.450 | 5.40 |
| 480 | 0.900 | 6.74 |
| 552 | 1.110 | 7.76 |
| 650 | 1.350 | 9.13 |
| 720 | 1.416 | 10.12 |
| 816 | 1.450 | 11.46 |
| 888 | 1.490 | 12.48 |
| 984 | 1.500 | 13.83 |

**Conversion: 1.60 ppm/0.013 ppm/24 hrs/day/365 days/year = years

Table 10 illustrates Formaldehyde Reduction by Year @0.013 ppm.

TABLE 10

| Time in Years * | Formaldehyde Reduction (%) |
|---|---|
| 1 | 92% |
| 2 | 92% |
| 3 | 91% |
| 4 | 87% |
| 5 | 78% |
| 6 | 60% |
| 7 | 40% |
| 8 | 28% |
| 9 | 19% |
| 10 | 13% |
| 11 | 10% |
| 12 | 8% |
| 13 | 6% |

Figure 2:
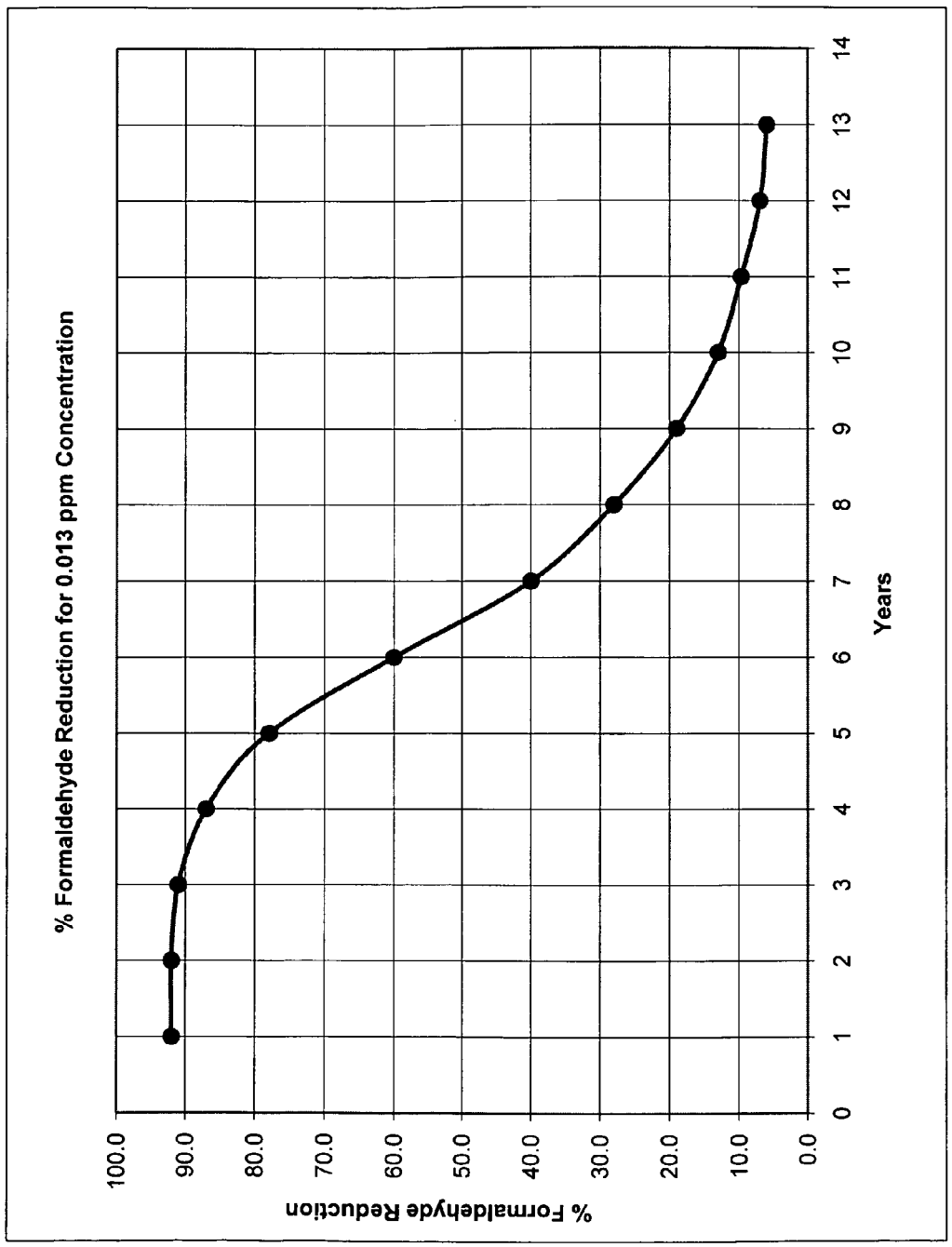
FIG. 2 is a graphic representation of Table 10 showing data of percent of formaldehyde reduced (Y) vs. time (X).

Table 10 is represented graphically in FIG. 2. As can be seen from the above data in Table 9, surprisingly, the addition of an amino silane and silica gel to a MVMC based coating provided a dramatic increase in longevity up to about 12 years for interior spaces. More specifically, the average formaldehyde reduction for a system containing amino silane, MVMC and silica gel achieves an average formaldehyde reduction of: 94% for the first year; 88% over the first 5 years; 60% reduction over the first 10 years; and 55% reduction over the first 12 years. Although it is well known to use MVMC's, such as calcium carbonate and magnesium carbonate, in construction materials and finishes, there is no reason to expect that its use in combination with amino silane would provide enhanced formaldehyde reduction.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

For example, although the preceding description illustrates the use of the unexpected superior aldehyde reducing system of the invention in a coating to be applied to surfaces in the interior building environment, the aldehyde reducing system can be used in the core of a building material such as an acoustical mineral fiber panel or gypsum wallboard and is not intended to be limited to its use in a coating. In addition, although the discussion and examples refer to application of the aldehyde reactive substance as it is applied to ceiling panel substrates, it is not a requirement to achieve the aforementioned unexpected superior spectrum of properties. The aldehyde reactive system is useful in or on walls as well as other interior building materials, and, therefore, the system is not intended to be limited to its use in or on a ceiling panel substrate. Also, as stated above, other MVMC's, such as magnesium carbonate, could be substituted for calcium carbonate in the above examples.

What is claimed is:

1. A composition that removes aldehydes from air in interior building environments, the composition comprising: an amino $C_{1-2}$ alkoxy silane; a binder selected from ethylene vinyl chloride, an epoxy, a urethane, a polyester, melamine, a natural or modified natural polymer, and a polymer or copolymer of vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, styrene, butadiene, and urethane; and a multivalent metal carbonate.

2. The composition of claim 1, wherein the amino $C_{1-2}$ alkoxy silane is a diamino $C_{1-2}$ alkoxy silane.

3. The composition of claim 1, wherein the amino $C_{1-2}$ alkoxy silane is selected from the group consisting of N-amino ethyl-aminopropyl-trimethoxy silane, N-amino ethyl-aminopropyl-triethoxy silane, N-amino ethyl-aminopropylmethyl-dimethoxy silane, N-amino ethyl-aminopropylmethyl-diethoxy silane, aminopropyl-triethoxy silane and aminopropyl-trimethoxy silane.

4. The composition of claim 1, wherein the multivalent metal carbonate is calcium carbonate or magnesium carbonate.

5. The composition of claim 1, further comprising silica gel.

6. The composition of claim 1 wherein the binder is ethylene vinyl chloride.

7. The composition of claim 1, wherein the composition reduces aldehydes from the air in an interior building environment.

8. The composition of claim 5, wherein the amino $C_{1-2}$ alkoxy silane forms a monolayer over the silica gel.

9. The composition of claim 8, wherein the monolayer forms in the absence of chemical grafting.

10. The composition of claim 1, wherein the composition provides a formaldehyde reduction of at least about 5% after 12 years.

11. The composition of claim 1, wherein the composition provides a formaldehyde reduction of at least about 25% after 8 years.

12. The composition of claim 1, wherein the composition provides a formaldehyde reduction of at least about 75% after 5 years.

13. The composition of claim 1, wherein the multivalent metal carbonate comprises calcium carbonate.

14. A surface covering comprising a building material and a coating, applied to a surface of a building material wherein the coating comprises the composition of claim 1.

15. The surface covering of claim 14, wherein the building material is gypsum board, mineral fiber board, fiberglass board, wood or wood composite, plastic, plaster, metal or textile.

* * * * *